United States Patent
Watanabe et al.

(10) Patent No.: US 8,970,983 B1
(45) Date of Patent: Mar. 3, 2015

(54) DISK STORAGE APPARATUS AND METHOD FOR ADJUSTING HEAD DISK INTERFERENCE SENSOR THRESHOLD

(71) Applicant: Kabushiki Kaisha Toshiba, Minato-ku (JP)

(72) Inventors: Daisuke Watanabe, Yokohama (JP); Hiroaki Sato, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/186,111

(22) Filed: Feb. 21, 2014

Related U.S. Application Data

(60) Provisional application No. 61/922,364, filed on Dec. 31, 2013.

(51) Int. Cl.
| | | |
|---|---|---|
| *G11B 5/02* | (2006.01) | |
| *G11B 5/60* | (2006.01) | |
| *G11B 17/32* | (2006.01) | |
| *G11B 19/04* | (2006.01) | |

(52) U.S. Cl.
CPC .............. *G11B 5/6011* (2013.01); *G11B 17/32* (2013.01); *G11B 19/042* (2013.01)
USPC .......................................... 360/75; 360/97.19

(58) Field of Classification Search
CPC .. G11B 5/6011; G11B 5/6017; G11B 5/6023; G11B 5/6029; G11B 5/6076; G11B 17/32; G11B 19/042
USPC .......................... 360/55, 97.19, 75, 230, 234
See application file for complete search history.

(56) References Cited

U.S. PATENT DOCUMENTS

| | | | | |
|---|---|---|---|---|
| 6,008,640 | A * | 12/1999 | Tan et al. | 324/212 |
| 7,742,255 | B2 | 6/2010 | Daugela et al. | |
| 8,139,308 | B2 | 3/2012 | Kim et al. | |
| 8,174,782 | B2 * | 5/2012 | Feliss et al. | 360/31 |
| 8,681,438 | B1 * | 3/2014 | Powers et al. | 360/25 |
| 2003/0007268 | A1 * | 1/2003 | Smith | 360/31 |
| 2008/0055772 | A1 * | 3/2008 | McMillan et al. | 360/86 |
| 2011/0141603 | A1 * | 6/2011 | Kazusawa et al. | 360/46 |
| 2011/0235207 | A1 * | 9/2011 | Yang | 360/75 |
| 2011/0235208 | A1 * | 9/2011 | Yang | 360/75 |
| 2013/0170073 | A1 * | 7/2013 | Zhao et al. | 360/97.19 |

* cited by examiner

*Primary Examiner* — Thomas Alunkal
(74) *Attorney, Agent, or Firm* — Oblon, McClelland, Maier & Neustadt, L.L.P.

(57) ABSTRACT

According to one embodiment, a disk storage apparatus includes a disk, a slider, and a controller. The slider includes a head having a write element, a read element, and a head disk interference (HDI) sensor. The controller detects at least abnormality in vibration of the head based on an alternating current component of interference detected by the HDI sensor and an HDI sensor threshold. The controller further measures a characteristic of the HDI sensor and a flying height of the head and adjusts the HDI sensor threshold based on results of the measurements.

12 Claims, 6 Drawing Sheets

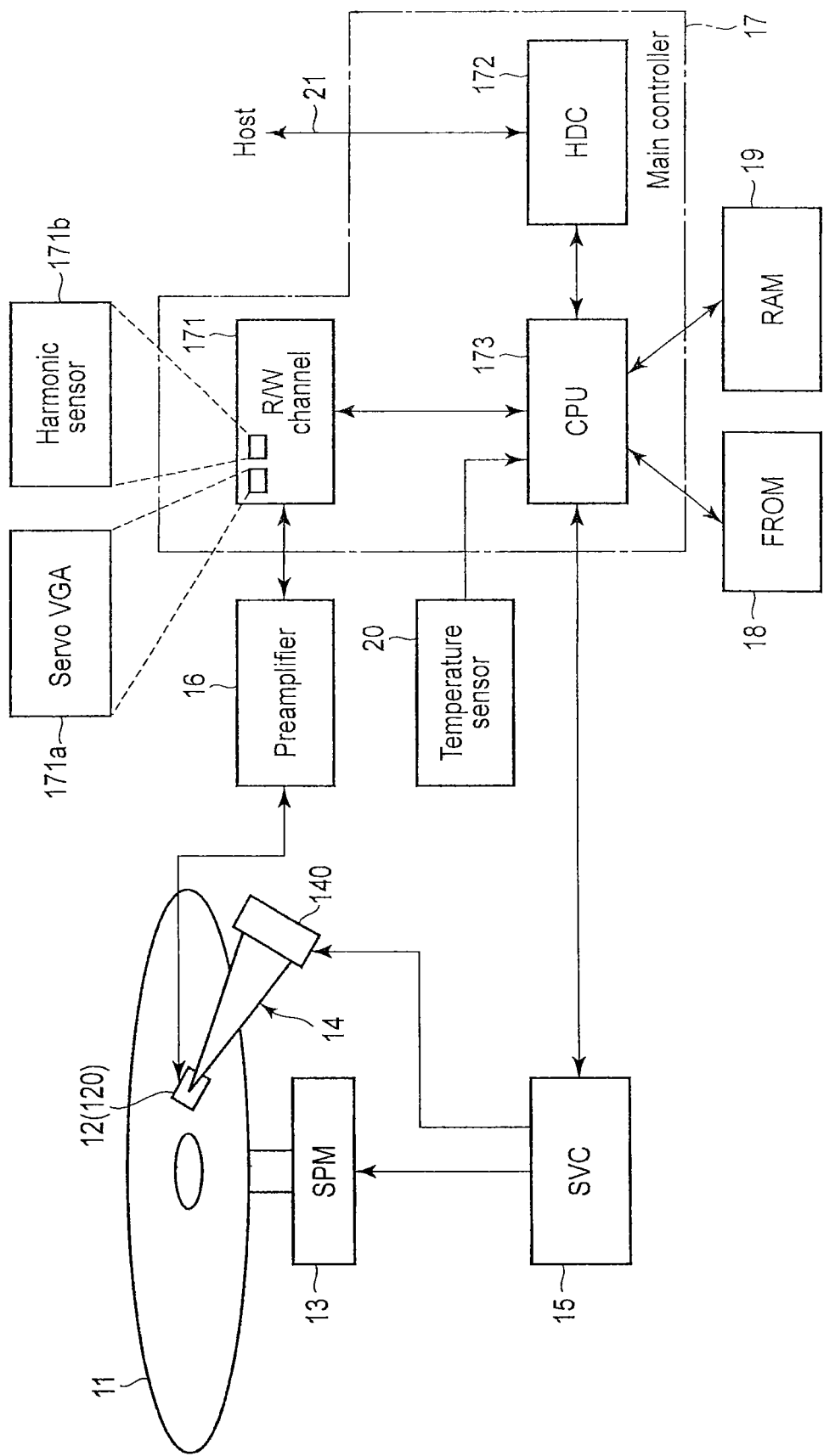
F I G. 1

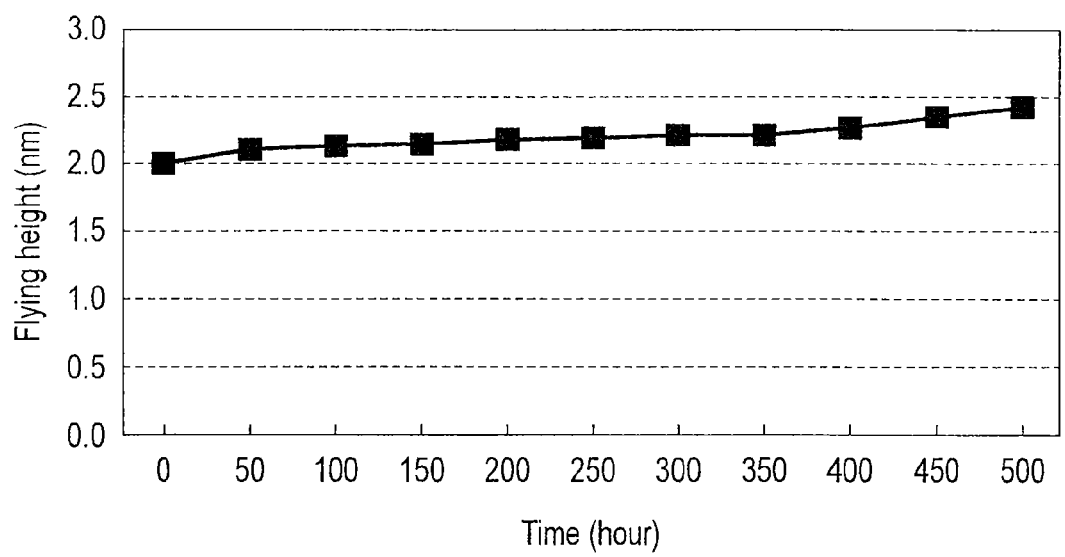
F I G. 3

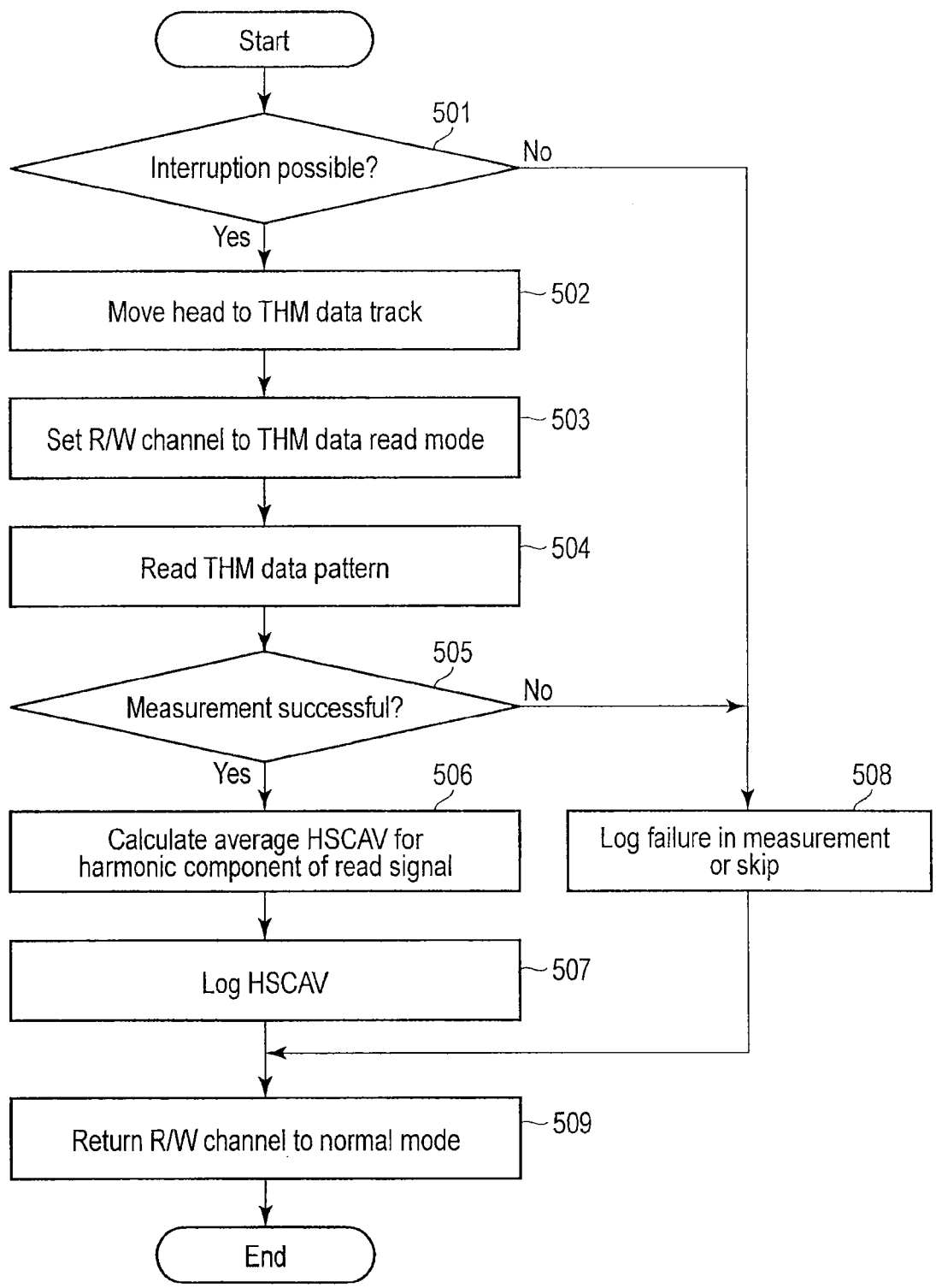
F I G. 5

DISK STORAGE APPARATUS AND METHOD FOR ADJUSTING HEAD DISK INTERFERENCE SENSOR THRESHOLD

CROSS-REFERENCE TO RELATED APPLICATIONS

This application claims the benefit of U.S. Provisional Application No. 61/922,364, filed Dec. 31, 2013, the entire contents of which are incorporated herein by reference.

FIELD

Embodiments described herein relate generally to a disk storage apparatus and a method for adjusting a head disk interference sensor threshold.

BACKGROUND

In recent years, disk storage apparatuses have exhibited considerably increased recording densities. Hard disk drives (HDDs) are known as typical disk storage apparatuses. To increase the recording density of an HDD, the magnetic head must be located as close to the surface of the magnetic disk (magnetic disk medium) as possible to the extent that the magnetic head can avoid contacting the magnetic disk. That is, it is necessary to reduce as much as possible the distance (spacing) between the magnetic head (hereinafter referred to as the head) and the magnetic disk (hereinafter referred to as the disk).

However, such increasingly reduced spacing is likely to lead to high-fly write (HFW) failure, which is a phenomenon where the head writes data to the disk at a spacing higher than normal. A possible cause of the increased spacing of the head (that is, the flying height) is that the head is caused to vibrate by its contact with a projection, a lubricant, or grease (more specifically, grease splashed onto the disk) on the disk. Furthermore, the head is also vibrated by the head's contact with a surface of the disk.

Prevention of a possible HFW failure requires detection of a phenomenon involving an increase in flying height, for example, vibration of the head. A head disk interference sensor is conventionally used to detect vibration of the head. The head disk interference sensor is also referred to as a head disk interface sensor. Like a write element and a read element, the head disk interference sensor (hereinafter referred to as the HDI sensor) is mounted on the head (more specifically the head slider). The HDI sensor electrically detects interference acting between the head and the disk (in other words, the interaction between the head and the disk), for example, thermal interference.

The HDI sensor detects the interference acting between the head and the disk in a selected one of two modes, an alternating current (AC) mode and a direct current (DC) mode. In general, when the vibration (in other words, the shake) of the head is to be detected, the HDI sensor is used in the AC mode. The HDI sensor detects an AC component of the interference acting between the head and the disk in the AC mode. A main controller for the HDD compares an output from the HDI sensor (that is, an AC component of the head disk interference detected by the HDI sensor) with a threshold (hereinafter referred to as an HDI sensor threshold) and thus determines whether the head is vibrating violently. Based at least on the result of the determination, the main controller, for example, allows the head to retry writing to the disk.

According to conventional techniques, the HDI sensor threshold is set by being determined during a test step included in the steps of manufacturing an HDD. However, the characteristics of the HDI sensor (particularly the resistance of the HDI sensor) change over time. Thus, when the HDI sensor threshold determined during the test step is used in a fixed manner, a change in the characteristics of the HDI sensor profoundly affects the HDI (head disk interference) detection capability of the HDI sensor in the AC mode. Furthermore, the flying height in a normal state changes over time.

BRIEF DESCRIPTION OF THE DRAWINGS

FIG. 1 is a block diagram showing an exemplary configuration of a hard disk drive (HDD) according to an embodiment;

FIG. 3 is a diagram showing an example of temporal changes in the flying height of a head shown in FIG. 1;

FIG. 5 is a flowchart showing a procedure for a flying height monitor data read process applied in the embodiment.

DETAILED DESCRIPTION

Figure 2:
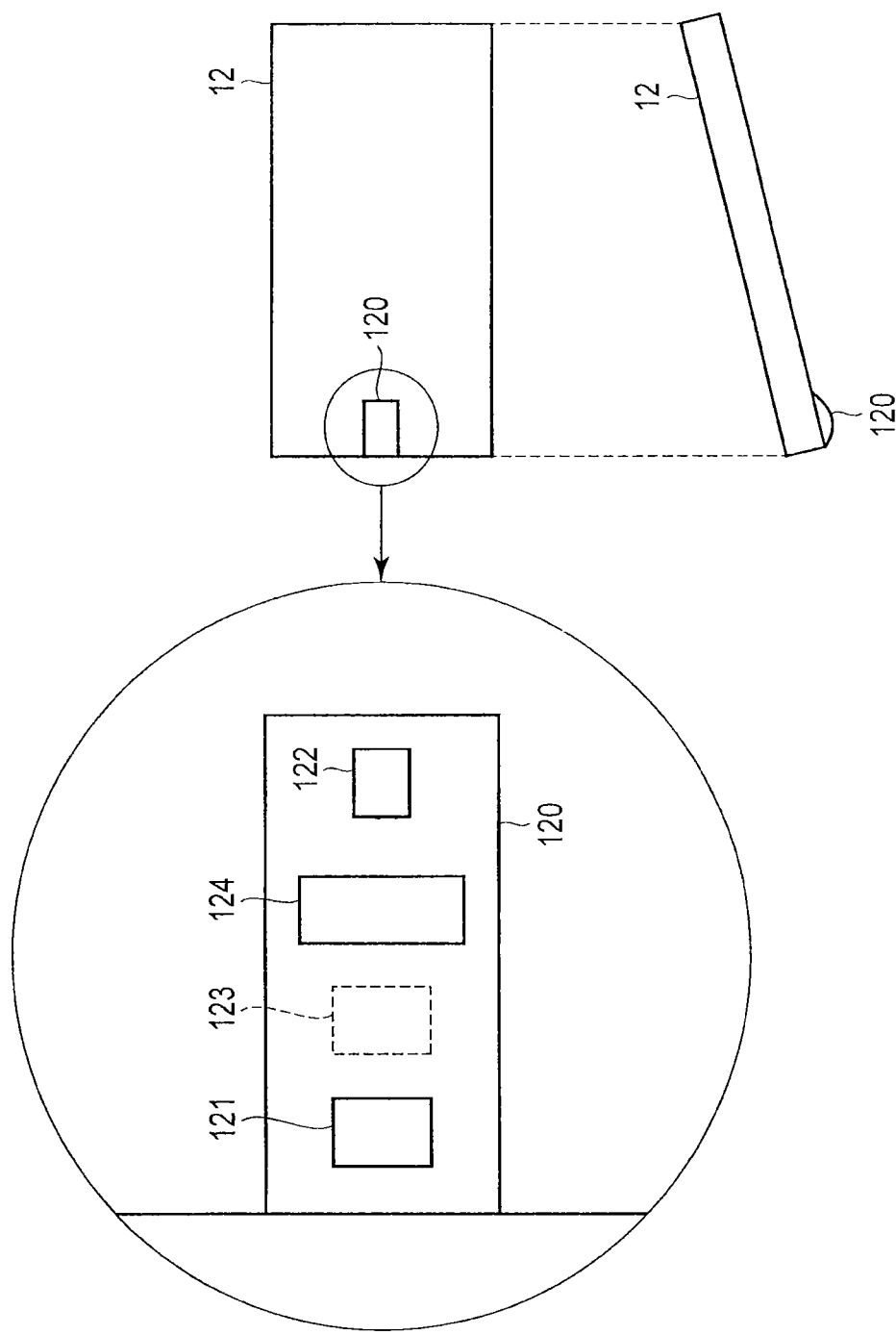
FIG. 2 is a schematic plan view and a schematic side view of a slider shown in FIG. 1.

Various embodiments will be described hereinafter with reference to the accompanying drawings.

In general, according to one embodiment, a disk storage apparatus comprises a disk, a slider, and a controller. The disk comprises a plurality of tracks. The slider is configured to fly over the disk and comprises a head comprising a write element, a read element, and an HDI sensor. The HDI sensor is configured to detect an alternating current component of interference acting between the head and the disk in an alternating current mode. The controller is configured to detect at least abnormality in vibration of the head based on the detected alternating current component and an HDI sensor threshold. The controller is further configured to measure a characteristic of the HDI sensor and a flying height of the head and to adjust the HDI sensor threshold based on results of the measurements.

FIG. 1 is a block diagram showing an exemplary configuration of a hard disk drive (HDD) according to an embodiment. The HDD is known as a typical disk storage apparatus and also referred to as a magnetic disk drive. The HDD (more specifically, an HDC 172 in the HDD) is connected to a host apparatus (hereinafter referred to as a host) via a host interface (storage interface) 21. The host utilizes the HDD as a storage device for the host. The host and the HDD are provided in an electronic apparatus such as a personal computer, a video camera, a music player, a mobile terminal, a mobile phone, or a printer device.

The HDD includes a disk (magnetic disk) 11, a slider (head slider) 12, a spindle motor (SPM) 13, an actuator 14, a servo controller (SVC) 15, a preamplifier 16, a main controller 17, a flash read only memory (FROM) 18, a random access memory (RAM) 19, and a temperature sensor 20. The disk 11 comprises, for example, on one surface thereof, a recording surface on which data is magnetically recorded. The disk 11 is rotated at high speed by the SPM 13. The SPM 13 is driven by a driving current (or a driving voltage) supplied by the SVC 15.

The disk 11 (more specifically, the recording surface of the disk 11) comprises a plurality of concentric tracks. The disk 11 may comprises a plurality of spirally arranged tracks. Each of the plurality of tracks comprises a plurality of discretely arranged servo areas (in other words, servo sectors). Servo data (a servo data signal) is recorded in each of the plurality of servo areas. As is well known, the servo data includes a servo mark, address data, and servo burst data. In each of the plurality of tracks, an area between the adjacent servo areas is used as a user data area. The user data area comprises a plurality of data sectors.

The disk 11 comprises a system area including a plurality of tracks. The system area is a storage area used by a system (for example, the main controller 17), in other words, a storage area that is not recognized by a user. A storage area in the disk which can be used by the user is referred to as a user area. In other words, the user area is a storage area recognized by the user. The disk further comprises, besides the system area, a special concentric area that is not recognized by the user (hereinafter referred to as a flying height monitor area). The flying height monitor area comprises a plurality of tracks. Each of the data sectors in a middle circumferential track (first track) in the flying height monitor area has a special data pattern (first data pattern) recorded therein and which is used to monitor the head flying height (more specifically, the flying height of a head 120 described below), in other words, flying height monitor data (hereinafter referred to as THM data). Thus, this track is hereinafter referred to as a THM data track. The THM data includes a well-known data pattern referred to as 212T and is known to resist thermal relaxation.

The slider 12 is disposed in association with the recording surface of the disk 11. The slider 12 is attached to a tip of a suspension extending from an arm of the actuator 14. The actuator 14 comprises a voice coil motor (VCM) 140 acting as a driving source for the actuator 14. The VCM 140 is driven by the driving current supplied by the SVC 15. When the actuator 14 is driven by the VCM 140, this causes the slider 12 to move over the disk 11 in the radial direction of the disk 11 so as to draw an arc.

FIG. 2 is a schematic plan view and a schematic side view of the slider 12 shown in FIG. 1. The slider comprises a head element section 120 formed at one end thereof. The head element section 120 includes a write element 121, a read element 122, a heater element 123, and an HDI sensor 124.

The write element 121 generates a magnetic field in accordance with a write current supplied by the preamplifier 16 and thus changes the magnetic pole of a corresponding area on the disk. Thus, data corresponding to the write current is written to (recorded on) the disk 11. In other words, the write element 121 is used to write data to the disk 11.

The read element 122 detects a magnetic field generated by the magnetic pole of a corresponding area on the disk 11 and converts the detected magnetic field into an electrical signal. Thus, the read element 122 reads data recorded in the disk 11. In other words, the read element 122 is used to read data from the disk 11.

The heater element 123 is, for example, a resistive heating element and generates heat upon being supplied with power (heater power) by the preamplifier 16. The heat generated by the heater element 123 causes the head element section 120 including the heater element 123 and thus thermally deforms to project toward the surface of the disk 11. Varying the amount of this projection (more specifically, heater power that determines the amount of projection) adjusts the spacing (flying height) between the head element section 120 and the disk 11 (more specifically, the surface of the disk 11). The head element section 120 is hereinafter simply referred to as the head 120. In other words, the slider 12 comprises the head 120. The slider 12 as a whole may be referred to as the head.

The HDI sensor 124 comprises, for example, a magnetoresistive (MR) element. The MR element is known as an element whose resistance changes markedly with respect to temperature. The HDI sensor 124 electrically detects interference between the HDI sensor 124 (the head 120 including the HDI sensor 124) and the disk 11 (in other words, interaction between the HDI sensor 124 and the disk 11). More specifically, the HDI sensor 124 detects the thermal interference acting between the head 120 and the disk 11 using the MR element in a selected one of two modes, an AC mode and a DC mode.

When vibration (shaking) of the head 120 needs to be detected, the HDI sensor 124 is used in the AC mode. In the AC mode, the HDI sensor 124 detects an AC component of the thermal interference acting between the head 120 and the disk 11.

With reference again to FIG. 1, a configuration of the HDD will be described. The SVC 15 drives the SPM 13 and the VCM 140 under the control of the main controller 17 (more specifically, a CPU 173 in the main controller 17). Driving the VCM 140 by the SVC 15 allows the head 120 to be positioned at a target track on the disk 11.

The preamplifier 16 is, for example, fixed at a predetermined position in the actuator 14 and electrically connected to the main controller 17 via a flexible printed circuit board (FPC). However, in FIG. 1, the preamplifier 16 is disposed away from the actuator 14 for convenience of drawing. The preamplifier 16 amplifies a signal (read signal) read by the read element 122 (see FIG. 2) in the head 120. The preamplifier 16 also converts write data output by the main controller 17 (more specifically, an R/W channel 171 in the main controller 17) into a write current and outputs the write current to the write element 121 in the head 120.

Furthermore, the preamplifier 16 supplies heater power HP to the heater element 123 (see FIG. 2) in the head 120 under the control of the main controller 17. The preamplifier 16 further detects the resistance of the HDI sensor 124 (see FIG. 2) in the head 120 under the control of the main controller 17.

The main controller 17 is implemented by, for example, a large-scale integrated circuit (LSI) with a plurality of elements integrated on a single chip. The main controller 17 includes the read/write (R/W) channel 171, a hard disk controller (HDC) 172, and the CPU 173.

The R/W channel 171 processes signals related to reading and writing. That is, the R/W channel 171 converts a read signal amplified by the preamplifier 16 into digital data and decodes the digital data into read data. The R/W channel 171 also encodes write data transferred by the HDC 172 via the CPU 173 and transfers the encoded write data to the preamplifier 16.

The R/W channel 171 also includes a variable gain amplifier (hereinafter referred to as a servo VGA) 171a. The servo VGA 171a operates at a timing corresponding to a servo area and amplifies a read signal amplified by the preamplifier 16 so that the resultant signal has a given amplitude. The R/W channel 171 converts the read signal with the given amplitude resulting from the amplification by the servo VGA 171a, into digital data, and extracts servo data from the digital data. An increase in the flying height of the head 120 (head flying height) reduces the amplitude of the read signal and thus increases the gain Sgain of the servo VGA 171a. In contrast, a decrease in head flying height increases the amplitude of the read signal and thus reduces the gain Sgain of the servo VGA. Hence, the gain Sgain of the servo VGA 171a can be utilized as an indicator for detecting a change in head flying height.

The R/W channel 171 further comprises a harmonic sensor (harmonic detector) 171b. The harmonic sensor 171b detects a harmonic component (for example, a triple harmonic component) of a THM data signal read from the THM data track by the head 120 (read element 122) in a TMH mode described below. As is well known, the magnitude of the harmonic component (triple harmonic component) of the read signal (in this case, the THM data signal) has a strong correlation with the flying height of the head 120. A large magnitude of the harmonic component is indicative of a small flying height of the head 120. A small magnitude of the harmonic component is indicative of a large flying height of the head 120.

The HDC 172 is connected to the host via the host interface 21. The HDC 172 functions as a host interface controller which receives signals transferred by the host and which transfers signals to the host. Specifically, the HDC 172 receives a command (a write command, a read command, or the like) transferred by the host and passes the command to the CPU 173. The HDC also controls data transfers between the host and the HDC 172. The HDC 172 further functions as a disk interface controller that controls data writing of data to the disk 11 and reading of data from the disk 11 via the preamplifier 16 and the head 120.

In accordance with an access request (write request or read request) from the host, the CPU 173 controls the SVC 15 and controls an access to the disk 11 via the R/W channel 171, the preamplifier 16, and the head 120. The control is performed in accordance with a control program.

In writing data to the disk 11 using the head 120, the CPU determines whether or not high-fly write is occurring. When high-fly write is occurring, the CPU 173 retries a write operation. The CPU 173 makes such determination based on the servo gain Sgain of the servo VGA 171a and the AC component of the output (the output voltage corresponding to the resistance) of the HDI sensor 124. Specifically, when the amount of change ΔSgain in servo gain Sgain is greater than a servo gain threshold and the AC component of the output from the HDI sensor is higher than an HDI sensor threshold, the CPU 173 determines that the head flying height is greater than a specified height due to violent vibration of the head 120 and that high-flow write is thus occurring. Furthermore, when the amount of change ΔSgain in servo gain Sgain is less than the servo gain threshold and the AC component is higher than the HDI sensor threshold, the CPU 173 determines that the head 120 has contacted with, for example, a projection on the disk 11. Additionally, by analyzing frequencies of the AC component, the CPU 173 can determine the cause of vibration of the head 120.

However, the head flying height varies over time even in a normal state. FIG. 3 shows an example of temporal changes in the flying height of the head 120 shown in FIG. 1. Furthermore, the resistance of the HDI sensor 124 in the normal state varies over time. Thus, when the HDI sensor threshold is fixed as is the case with the conventional techniques, the CPU 173 may make an erroneous determination, for example, in connection with the high-fly write as described above. More specifically, the CPU 173 may erroneously determine that high-fly write is not occurring although it actually is. Conversely, the CPU 173 may erroneously determine that high-fly write is occurring although it actually is not. Thus, the conventional techniques may involve misdetection (in other words, over-detection or non-detection) of high-fly write.

Thus, according to the embodiment, the CPU 173 monitors changes in the resistance of the HDI sensor 124 and in head flying height in the normal state. The CPU 173 dynamically adjusts the HDI sensor threshold based on the results of the monitoring.

The FROM 18 is a rewritable nonvolatile memory. A control program is stored in the FROM 18. The control program includes an HDI sensor resistance measurement routine, a flying height monitor data read routine, and an HDI sensor threshold adjustment routine. An initial program loader (IPL) may be stored in the FROM 18, and the control program may be stored in the disk 11. In this case, when the HDD is powered on, the CPU 173 may execute the IPL and thus loads the control program from the disk 11 into the FROM 18 or the RAM 19.

The RAM 19 is a volatile memory such as a dynamic RAM. A storage area in the RAM 19 is partly used as a work area for the CPU 173. The temperature sensor 20 detects the temperature (environmental temperature) of the HDD shown in FIG. 1.

Figure 4:
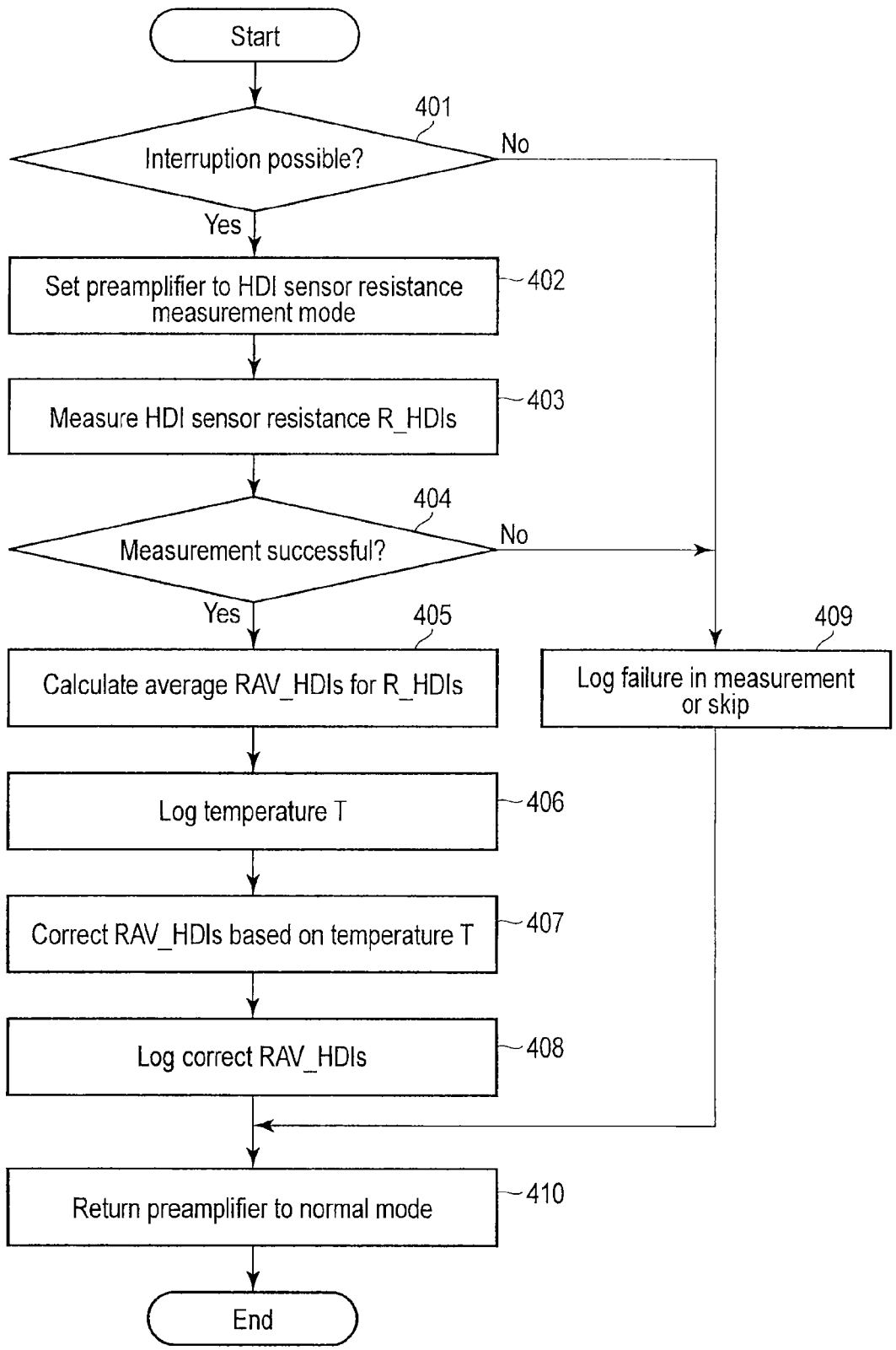
FIG. 4 is a flowchart showing a procedure for an HDI sensor resistance measurement process applied in the embodiment.

Now, operations of the embodiment will be described. First, an HDI sensor resistance measurement process applied in the embodiment will be described with reference to FIG. 4. FIG. 4 is a flowchart showing a procedure for the HDI sensor resistance measurement process. The HDI sensor resistance measurement process is repeatedly started in accordance with a schedule (first schedule) defined in the control program. More specifically, the HDI sensor resistance measurement process is started every given time (for example, one hour) when the HDI sensor resistance measurement routine is invoked in accordance with the schedule. The HDI sensor resistance measurement routine is included in the control program.

When the HDI sensor resistance measurement process is started, the CPU 173 first determines whether an interruption for the HDI sensor resistance measurement process is possible (block 401). If the HDD shown in FIG. 1 is ready, the interruption is possible (Yes in block 401). The CPU 173 executes the HDI sensor resistance measurement process as follows. First, the CPU 173 sets the preamplifier 16 to HDI sensor to an HDI sensor resistance measurement mode (block 402). Then, the CPU 173 measures the resistance R_HDIs of the HDI sensor 124 (in other words, the HDI sensor resistance R_HDIs) a predetermined number of times (a first number of times), for example, three times, via the preamplifier 16 (block 403). The CPU 173 determines whether the measurement is successful (block 404).

If the measurement is successful (Yes in block 404), in other words, if the HDI sensor resistance R_HDIs has been acquired three times, the CPU 173 proceeds to block 405. In block 405, the CPU 173 calculates an average value (HDI sensor average resistance) RAV_HDIs for the measured HDI sensor resistance R_HDIs. The CPU 173 also logs the temperature T of the HDD detected by the temperature sensor 20 during measurement of the HDI sensor resistance, for example, in a second area in the system area in the disk 11 (block 406).

The HDI sensor resistance is known to change linearly with respect to temperature. Thus, the CPU 173 corrects (in other words, converts) the calculated HDI sensor average resistance RAV_HDIs to an HDI sensor average resistance RAV_HDIs at a reference temperature based on the temperature T measured during the detection of the HDI sensor resistance (block 407). The CPU 173 logs the corrected HDI sensor average resistance RAV_HDIs (in other words, the HDI sensor average resistance RAV_HDIs at the reference temperature) in the second area in the system area in the disk 11 in association with the temperature T (block 408). The CPU 173 proceeds to block 410.

On the other hand, if the measurement of the HDI sensor resistance R_HDIs fails (No in block 404), the CPU 173 proceeds to block 409. In this case, in block 409, the CPU 173 logs the failure to measure the HDI sensor resistance R_HDIs in the second area in the system area in the disk 11. Similarly, when the interruption is impossible (No in block 401), the CPU 173 proceeds to block 409. In this case, in block 409, the CPU 173 logs a skip of substantial execution of the HDI sensor resistance measurement process, in the second area in the system area in the disk 11.

Upon executing block 408 or 409, the CPU 173 proceeds to block 410. In block 410, the CPU 173 returns the preamplifier 16 from the HDI sensor resistance measurement mode to a normal mode. This temporarily ends the HDI sensor resistance measurement process, which process is started again one hour later.

Now, a flying height monitor data read process applied in the embodiment will be described with reference to FIG. 5. FIG. 5 is a flowchart showing a procedure for the flying height monitor data read process. The flying height monitor data read process is repeatedly started in accordance with the above-described schedule similarly to the HDI sensor resistance measurement process. More specifically, the flying height monitor data read process is started, for example, every one hour when the flying height monitor data read routine is invoked in accordance with the schedule. The flying height monitor data read routine is included in the control program.

When the flying height monitor data read process is started, the CPU 173 first determines whether an interruption for the flying height monitor data read process is possible (block 501). If the interruption is possible (Yes in block 501), the CPU 173 controls the SVC 15 and thus moves the head to the THM data track (block 502). The CPU 173 then sets the R/W channel 171 to a THM data (flying height monitor data) read mode (block 503).

The CPU 173 then uses the head 120, the preamplifier 16 and the R/W channel 171, and thus performs an operation of reading a THM data pattern from each of the data sectors in the THM data track while the disk 11 rotates a predetermined number of times (for example, five times) (block 504). In other words, the CPU 173 repeats an operation of reading the THM data pattern from the THM data track five times. The harmonic sensor 171b in the R/W channel 171 detects (extracts) a harmonic component (for example, a triple harmonic component) of a read signal (in this case, a THM data pattern signal) which is read by the head 120 and which is amplified by the preamplifier 16.

The CPU 173 then determines whether the read operation (measurement of the harmonic component of the THM data pattern signal) is successful (block 505). If the read operation is successful (Yes in block 505), the CPU 173 proceeds to block 506. In block 506, the CPU 173 calculates an average value HSCAV for the harmonic component of the read signal (in this case, the THM data pattern signal) acquired in block 504. The CPU 173 then logs the average value HSCAV for the harmonic component of the THM data pattern signal in a third area in the system area in the disk 11 (block 507).

On the other hand, when the measurement (read operation) of the harmonic component of the THM data pattern signal fails (No in block 505), the CPU 173 proceeds to block 508. In this case, in block 508, the CPU 173 logs the failure to measure the harmonic component of the THM data pattern signal in the third area in the system area in the disk 11. Similarly, when the interruption is impossible (No in block 501), the CPU 173 proceeds to block 508. In this case, in block 508, the CPU 173 logs a skip of substantial execution of the flying height monitor data read process in the third area in the system area in the disk 11.

Upon executing block 507 or 508, the CPU 173 proceeds to block 509. In block 509, the CPU 173 returns the R/W channel 171 from the THM data (flying height monitor data) read mode to the normal mode. Thus, the flying height monitor data read process is temporarily ended, and is started again one hour later.

Figure 6:
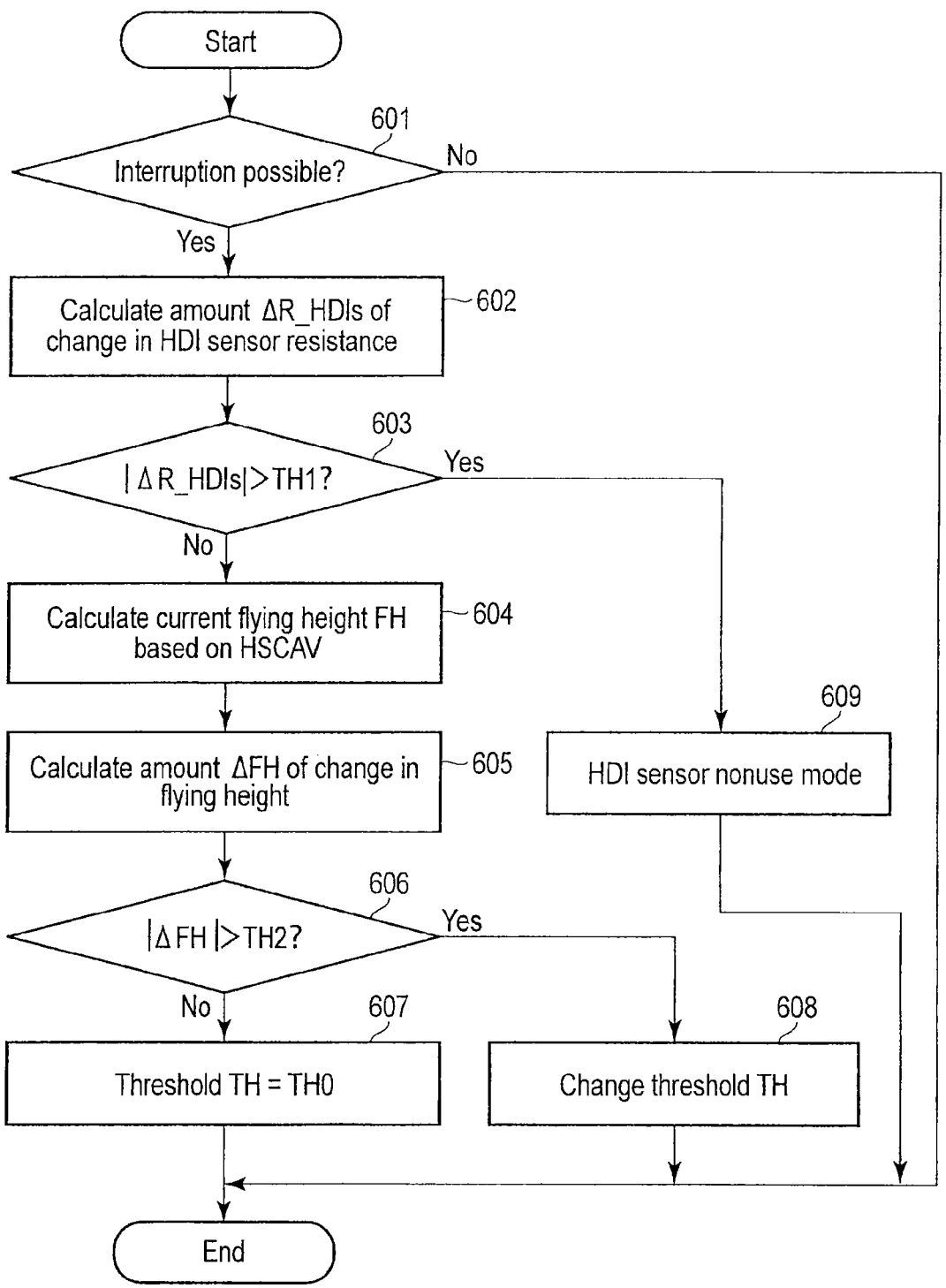
FIG. 6 is a flowchart showing a procedure for an HDI sensor threshold adjustment process applied in the embodiment.

Now, an HDI sensor threshold adjustment process applied in the embodiment will be described with reference to FIG. 6. FIG. 6 is a flowchart showing a procedure for the HDI sensor threshold adjustment process. The HDI sensor threshold adjustment process is repeatedly started in accordance with the above-described schedule similarly to the HDI sensor resistance measurement process. More specifically, the HDI sensor threshold adjustment process is started, for example, every one hour when the HDI sensor threshold adjustment routine is invoked in accordance with the schedule. The HDI sensor threshold adjustment routine is included in the control program.

When the HDI sensor threshold adjustment process is started, the CPU 173 first determines whether an interruption for the HDI sensor threshold adjustment process is possible (block 601). If the interruption is possible (Yes in block 601), the CPU 173 proceeds to block 602. In this case, it is assumed that the following values are recorded in the first area in the system area in the disk 11, for example, during a test step for the HDD shown in FIG. 1: an initial HDI sensor threshold TH0 at the reference temperature (for example, 25° C.), an average value RAV0_HDIs for initial HDI sensor resistance, and an initial head flying height FH0. In other words, TH0, RAV0_HDIs, and FH0 recorded in the first area in the system area are obtained before shipment of the HDD, and are initial values (or reference values) used when the user starts to use the HDD.

In block 602, the CPU 173 calculates the amount ΔR_HDIs of change in HDI sensor resistance as follows. First, the CPU 173 reads the initial HDI sensor average resistance RAV0_HDIs from the first area in the system area in the disk 11. The CPU 173 also reads the current (latest) HDI sensor average resistance RAV_HDIs from the second area in the system area in the disk 11. The CPU 173 then calculates the difference between the current HDI sensor average resistance RAV_HDIs and the initial HDI sensor average resistance RAV0_HDIs, as the amount ΔR_HDIs of change in HDI sensor resistance (first amount of change).

Then, the CPU 173 determines whether the absolute value |ΔR_HDIs| of the amount ΔR_HDIs of change in HDI sensor resistance is greater than a predetermined threshold (first threshold) TH1 (block 603). If |ΔR_HDIs| is not greater than the threshold TH1 (No in block 603), the CPU 173 determines the HDI sensor 124 to be normal. In this case, the CPU 173 proceeds to block 604.

In block 604, the CPU 173 calculates the current head flying height FH based on the average value HSCAV for the harmonic component of the THM data pattern signal recorded in the third area in the system area in the disk 11. A method for calculating the head flying height FH is conventionally known. Thus, the description of the calculation method is omitted.

Then, the CPU 173 calculates the amount ΔFH of change in head flying height (second amount of change) based on the current head flying height FH and the initial head flying height FH0 as follows (block 605). First, the CPU 173 reads the value of the initial head flying height FH0 from the first area in the system area in the disk 11. The CPU 173 then calculates the difference between the current head flying height FH and the initial head flying height FH0 as the amount ΔFH of change in head flying height.

Then, the CPU 173 determines whether the absolute value |ΔFH| of the amount ΔFH of change in head flying height is greater than a predetermined threshold (second threshold) TH2 (block 606). If |ΔFH| is not greater than TH2 (No in block 606), the CPU 173 determines that the amount of change in head flying height since shipment of the HDD is small and that the HDI sensor threshold TH need thus not be changed from the initial HDI sensor threshold TH0. In this case, the CPU 173 sets the HDI sensor threshold TH to the initial HDI sensor threshold TH0 (block 607).

In contrast, when |ΔFH| is greater than the threshold TH2 (Yes in block 606), the CPU 173 determines that the amount of change in head flying height since shipment of the HDD is great and that the HDI sensor threshold TH thus needs be changed from the initial HDI sensor threshold TH0. In this case, the CPU 173 changes the HDI sensor threshold TH as follows (block 608). First, the CPU 173 determines whether the sign of ΔFH is positive or negative. When the sign of ΔFH is positive, in other words, when the head flying height FH has changed in a direction in which the value increases from the initial head flying height FH0, the CPU 173 determines a threshold greater than the initial HDI sensor threshold TH0 by a value corresponding to |ΔFH|, as the HDI sensor threshold TH. In contrast, when the sign of ΔFH is negative, in other words, when the head flying height FH has changed in a direction in which the value decreases from the initial head flying height FM0, the CPU 173 determines a threshold less than the initial HDI sensor threshold TH0 by the value corresponding to |ΔFH|, as the HDI sensor threshold TH. Thus, the CPU 173 changes the HDI sensor threshold TH to the determined threshold. In other words, the CPU 173 adjusts the HDI sensor threshold TH to an optimum value reflecting the amount AFH of change in head flying height.

On the other hand, when |ΔR_HDIs| is greater than the threshold TH1, the CPU 173 determines the HDI sensor 124 to be abnormal. In this case, the CPU 173 proceeds to block 609. In block 609, the CPU 173 sets the HDD to an HDI sensor nonuse mode so as to prevent the HDI sensor 124 from being used in the HDD. Setting of the HDI sensor nonuse mode inhibits the HDI sensor 124 from being used to detect at least abnormality in vibration of the head 120.

Upon executing block 607, 608, or 609, the CPU 173 ends the HDI sensor threshold adjustment process. Furthermore, when the interruption is impossible (No in block 601), the CPU 173 immediately ends the HDI sensor threshold adjustment process. In other words, when the interruption is impossible (No in block 601), the CPU 173 skips substantial execution of the HDI sensor threshold adjustment process and ends the HDI sensor threshold adjustment process. The thus ended HDI sensor threshold adjustment process is started again one hour later.

As described above, the embodiment monitors the state (operational state) of the HDD every one hour (block 401, 501, or 601) and executes the HDI sensor resistance measurement process, the flying height monitor data read process, and the HDI sensor threshold adjustment process, using a period when the HDD is ready. Hence, the embodiment can prevent these processes from affecting the performance of the HDD.

Furthermore, each time each of the above-described processes is executed, the embodiment acquires the amount of change in HDI sensor resistance (first amount of change) and the amount of change in head flying height (second amount of change) since the initial state of the HDD (the state before shipment). Based on the acquired amounts of change, the embodiment adjusts the HDI sensor threshold to a value suitable for the current HDI sensor resistance and head flying height. In other words, the embodiment feeds the acquired amounts of change back to the HDI sensor threshold (reflects the amount of change in the HDI sensor threshold) and thus adjusts the HDI sensor threshold to the optimum value. As described above, the embodiment dynamically adjusts the HDI sensor threshold and thus can maximally utilize the HDI detection capability of the HDI sensor 124. That is, the embodiment can accurately detect abnormality such as high-fly write or a contact between the head 120 and a small projection using the dynamically adjusted HDI sensor threshold and the AC component of the output from the HDI sensor 124 (and further the servo gain of the servo VGA 171*a*).

Moreover, the embodiment detects an abnormal change in the resistance of the HDI sensor 124 which may profoundly affect the HDI detection capability of the HDI sensor 124 in the AC mode and thus inhibits the utilization of the HDI sensor 124. The embodiment can thus prevent the HDI sensor 124 from being utilized in an abnormal state and from leading to more frequent over-detections or non-detections of abnormality such as high-fly write.

The embodiment starts the HDI sensor resistance measurement process, the flying height monitor data read process, and the HDI sensor threshold adjustment process, every one hour in accordance with the predetermined schedule. However, the time intervals at which these processes are started need not necessarily be one hour or be constant.

According to the embodiment, the slider 12 (head 120) is disposed in association with one surface of the disk 11. Here, it is assumed that, unlike in the embodiment, a pair of sliders (heads) is disposed in association with the respective opposite surfaces of the disk 11. In this case, the HDI sensor resistance measurement process, the flying height monitor data read process, and the HDI sensor threshold adjustment process may be executed for each of the heads. This also applies to an HDD with a plurality of disks 11 arranged therein. The HDI sensor resistance generally changes linearly with respect to temperature. However, sensitivity at which the HDI sensor resistance changes with respect to temperature is know not to vary significantly among the heads. Thus, the CPU 173 can calculate the HDI sensor resistance for each head taking the temperature into account (in other words, execute a conversion into the HDI sensor resistance at the reference temperature), using the same calculation formula (conversion formula).

The flying height of the head 120 is known to depend on the radial position with respect to the disk 11 at which the head 120 is positioned. Thus, the recording surface of the disk 11 may be divided into a plurality of concentric areas (hereinafter referred to as zones) for management, with each of the plurality of zones comprising a flying height monitor area. Furthermore, the following may be recorded in the first area in the system area for each of the zones: the initial HDI sensor threshold TH0, the initial HDI sensor average resistance RAV0_HDIs, and the value of the initial head flying height FH0. In such a configuration, the CPU 173 can execute the HDI sensor resistance measurement process, the flying height monitor data read process, and the HDI sensor threshold adjustment process for each of the zones and determine the HDI sensor threshold for each of the zones.

At least one embodiment described above can dynamically adjust the HDI sensor threshold according to changes in the characteristics of the HDI (head disk interference) sensor and in flying height. This allows the HDI detection capability of the HDI sensor to be maximally displayed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus comprising:
a disk comprising a plurality of tracks;
a slider configured to fly over the disk, the slider comprising a head comprising a write element, a read element, and a head disk interference (HDI) sensor, the HDI sensor being configured to detect an alternating current component of interference acting between the head and the disk in an alternating current mode; and
a controller configured to:
detect at least abnormality in vibration of the head based on the detected alternating current component and an HDI sensor threshold;
measure a characteristic of the HDI sensor and a flying height of the head, and characteristic of the HDI sensor including resistance of the HDI sensor; and
adjust the HDI sensor threshold based on results of the measurements,
wherein to adjust the HDI sensor threshold, the controller is configured to
calculate a first amount of change in the resistance of the HDI sensor based on the measured resistance and a pre-measured initial resistance of the HDI sensor,
calculate a second amount of change in the flying height of the head based on the measured flying height and a pre-measured initial flying height of the head, and
reflect the second amount of change in the HDI sensor threshold when an absolute value of the first amount of change is less than a first threshold and when an absolute value of the second amount of change is greater than a second threshold.

2. The disk storage apparatus of claim 1, wherein to reflect the second amount of change in the HDI sensor threshold, the controller is further configured to determine the HDI sensor threshold based on an initial HDI sensor threshold and the second amount of change.

3. The disk storage apparatus of claim 2, wherein to adjust the HDI sensor threshold, the controller is further configured to determine the initial HDI sensor threshold as the HDI sensor threshold when the absolute value of the first amount of change is less than the first threshold and when the absolute value of the second amount of change is less than the second threshold.

4. The disk storage apparatus of claim 1, wherein the controller is further configured to inhibit use of the HDI sensor at least for detection of abnormality in vibration of the head when the absolute value of the first amount of change is greater than the first threshold.

5. The disk storage apparatus of claim 1, wherein the controller is further configured to:
repeat the measurement of the characteristic of the HDI sensor and the measurement of the flying height of the head in accordance with a first schedule; and
adjust the HDI sensor threshold based on the results of the measurements each time the measurements are executed.

6. The disk storage apparatus of claim 1, wherein:
a first data pattern used to monitor the flying height of the head is recorded in a first track in the disk;
the disk storage apparatus further comprises a harmonic sensor configured to detect a harmonic of a read signal read by the head; and
the controller is further configured to:
read the first data pattern from the first track using the head; and
calculate the flying height of the head based on the harmonic detected, by the harmonic sensor, from the read signal corresponding to the read first data pattern.

7. A method for adjusting a head disk interference (HDI) sensor threshold in a disk storage apparatus comprising a disk and a slider, the disk comprising a plurality of tracks, the slider being configured to fly over the disk and comprising a head comprising a write element, a read element, and an HDI sensor, the HDI sensor being configured to detect an alternating current component of interference acting between the head and the disk in an alternating current mode, the method comprising:
detecting at least abnormality in vibration of the head based on the detected alternating current component and an HDI sensor threshold;
measuring a characteristic of the HDI sensor and a flying height of the head, the characteristic of the HDI sensor including resistance of the HDI sensor; and
adjusting the HDI sensor threshold based on results of the measurements,
wherein adjusting the HDI sensor threshold comprises,
calculating a first amount of change in the resistance of the HDI sensor based on the measured resistance and a pre-measured initial resistance of the HDI sensor,
calculating a second amount of change in the flying height of the head based on the measured flying height and a pre-measured initial flying height of the head, and
reflecting the second amount of change in the HDI sensor threshold when an absolute value of the first amount of change is less than a first threshold and when an absolute value of the second amount of change is greater than a second threshold.

8. The method of claim 7, wherein reflecting the second amount of change in the HDI sensor threshold comprises determining the HDI sensor threshold based on an initial HDI sensor threshold and the second amount of change.

9. The method of claim 8, wherein adjusting the HDI sensor threshold further comprises determining the initial HDI sensor threshold as the HDI sensor threshold when the absolute value of the first amount of change is less than the first threshold and when the absolute value of the second amount of change is less than the second threshold.

10. The method of claim 7, further comprising inhibiting use of the HDI sensor at least for detection of abnormality in vibration of the head when the absolute value of the first amount of change is greater than the first threshold.

11. The method of claim 7, further comprising:
repeating the measurement of the characteristic of the HDI sensor and the measurement of the flying height of the head in accordance with a first schedule; and
adjusting the HDI sensor threshold based on the results of the measurements each time the measurements are executed.

12. The method of claim 7, wherein:
a first data pattern used to monitor the flying height of the head is recorded in a first track in the disk;

the disk storage apparatus further comprises a harmonic sensor configured to detect a harmonic of a read signal read by the head; and the method further comprises reading the first data pattern from the first track using the head; and calculating the flying height of the head based on the harmonic detected, by the harmonic sensor, from the read signal corresponding to the read first data pattern.

* * * * *